United States Patent [19]

Wilke et al.

[11] 4,020,404
[45] Apr. 26, 1977

[54] SYSTEM FOR CONTROLLING MOTOR SPEED

[76] Inventors: Richard Wilke, Am Weissenfeld 4, 583 Schwelm; Helmut Korthaus, Fernblick 3, 56 Wuppertal-Barmen, both of Germany

[22] Filed: Apr. 23, 1975

[21] Appl. No.: 570,583

[30] Foreign Application Priority Data

Apr. 24, 1974 Germany .................... 2419744

[52] U.S. Cl. .......................... 318/318; 318/328
[51] Int. Cl.² .......................................... H02P 5/06
[58] Field of Search ........................... 318/328, 318

[56] References Cited

UNITED STATES PATENTS

| | | | |
|---|---|---|---|
| 2,734,161 | 2/1956 | Fryklund | 318/328 |
| 2,828,459 | 3/1958 | Pear, Jr. | 318/318 |
| 3,079,523 | 2/1963 | Thieme | 318/318 X |
| 3,097,332 | 7/1963 | Mullin | 318/328 X |
| 3,665,276 | 5/1972 | Fujii et al. | 318/318 |
| 3,800,188 | 3/1974 | Wilke | 317/9 R |

*Primary Examiner*—B. Dobeck
*Attorney, Agent, or Firm*—Ernest G. Montague; Karl F. Ross; Herbert Dubno

[57] ABSTRACT

A motor has a shaft carrying a dielectric disk on whose edge is fitted an undulating iron ring formed with a plurality of angularly equispaced points that pass beneath a magnetic detector head that generates a sinusoidal voltage signal having a frequency proportional to the rotation velocity of the shaft. This sinusoidal signal is clipped at a minimum signal level and then fed to an amplifier once it has passed through a resonant circuit tuned to a frequency corresponding to the desired motor rotation speed. The output side of this resonant circuit is connected via a capacitor and variable resistance to the input of a Schmitt trigger which operates a relay controlling the motor so as to maintain the motor speed within a desired range.

7 Claims, 4 Drawing Figures

SYSTEM FOR CONTROLLING MOTOR SPEED

FIELD OF THE INVENTION

The present invention relates to an apparatus for controlling the rotation speed of a shaft driven by a motor. More particularly this invention concerns an electronic control system that can be used for altering motor speed when the speed goes above or below a predetermined speed range.

BACKGROUND OF THE INVENTION

In U.S. Pat. No. 3,800,188 issued 26 Mar. 1974 I disclose a motor speed control that can be used in an industrial system, such as a bottling plant, in order to maintain the rotation speed of a motor output shaft within a predetermined range. This device basically comprises a dielectric synthetic-resin disk secured to the shaft and provided on its outer periphery with an undulating ferromagnetic ring. Spaced approximately 0.4 mm from this ring is a fixed detector head containing at least one permanent magnet and coil. As the shaft and disk rotate the undulations of the ring pass the detector head and induce a voltage in its coil. As the shaft and disk rotate, therefore, the coil produces a signal which is almost perfectly sinusoidal and which has a frequency which is directly proportional to the rotation of speed of the shaft.

This sinusoidal signal is passed through a resonant circuit which is tuned to a frequency corresponding to the desired rotational speed of the shaft. A differential amplifier and switching circuit are connected to this resonant circuit and to the motor. When the frequency fed to the resonant circuit rises above or below the frequency to which this circuit is tuned, its output drops off sharply and the switching means may operate so as to shut off the motor, increase its speed, or decrease its speed in order to compensate for the detected variation of the actual motor speed from the desired speed.

OBJECTS OF THE INVENTION

It is an object of the present invention to provide an improved speed control apparatus of the above-described general type.

Another object is the provision of such an apparatus which allows the detector head carrying the coil and magnet to be spaced further from the ring than has hitherto been possible in order to prevent the device from being damaged should the ring become slightly eccentric or should a small foreign body find its way between the disk and the detector head.

Yet another object is the provision of such an apparatus which can be adjusted for relatively fine or relatively coarse control of the motor speed.

SUMMARY OF THE INVENTION

These objects are attained according to the present invention in an apparatus for controlling the rotation speed of a shaft driven by a motor wherein a plurality of angularly equispaced magnetically detectable elements are carried on the shaft. A generator having a detector head of the above-described general type is connected to a threshold amplifier which clips the sinusoidal signal from the generator to form a succession of pulses of like amplitude and then increases the amplitude of the clipped pulses. A filter or detector is connected to this threshold amplifier and includes a resonant circuit which generates an output only when the succession of pulses has a frequency within a predetermined range. A switching arrangement is connected between the detector or filter and the motor and alters the motor speed when the detector means stops generating its output, which condition occurs when the shaft speed varies from an ideal speed to an extent greater than a maximum permissible amount.

In accordance with a further feature of this invention the clipper includes a diode and the amplifier includes a transistor across which this diode is connected, a capacitor connecting the base of the transistor with the detector head, and a zener diode which serves to stabilize this transistor. Connected in back of the filter is a detector having a capacitor and a diode which convert the sinusoidal output of the filter into a direct-current voltage signal which is fed to the switch means. A Schmitt trigger in this switch means generates a control output signal only when the voltage signals exceeds a predetermined threshold level. A relay in the switch means is connected between the trigger and the motor and is operable by the control output signal of the trigger to alter the rotation speed of the motor when this rotation speed varies by more than a predetermined maximal amount from a predetermined ideal speed.

According to yet another feature of this invention means is provided to disable the motor control and allow the motor at the start of operation to get up to speed. Thereafter this disabling means is cut out and the motor-speed control operates as described above. Absent such an arrangement the control system would prevent the motor from achieving the desired speed before it went into action and shut the system down.

In accordance with this invention it is possible to space the detector head from the periphery of the shaft-carried wheel by a distance of between 0 mm and 1.5 mm more than the distance of 0.4 mm to 0.5 mm normally used. Even if the disk is eccentric, the combination of an amplifier and a clipper produces a succession of like pulses having a frequency directly proportional to the rotational speed of the shaft. The criticality of the spacing between the disk and the detector head is therefore almost completely eliminated, along with the necessity of spacing the two very closely together so that the possibility of the system fouling and becoming inoperative is greatly reduced.

According to another feature of this invention the hitherto used differential amplifier is replaced by the above-mentioned Schmitt trigger. The output of the filter is fed as described above through a series-connected capacitor and diode to the wiper of the potentiometer whose opposite ends are connected between one input of the Schmitt trigger and ground. Thus the position of the wiper determines the sensitivity of the control system.

BRIEF DESCRIPTION OF THE DRAWING

The above and other objects, features and advantages of the invention will become more readily apparent from the following description, reference being made to the accompanying drawing in which.

SPECIFIC DESCRIPTION

Figure 3:
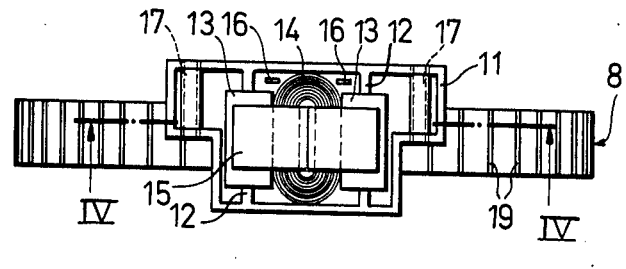
FIG. 3 is a top view of the detector head and sensor wheel of the system according to this invention.
Figure 4:
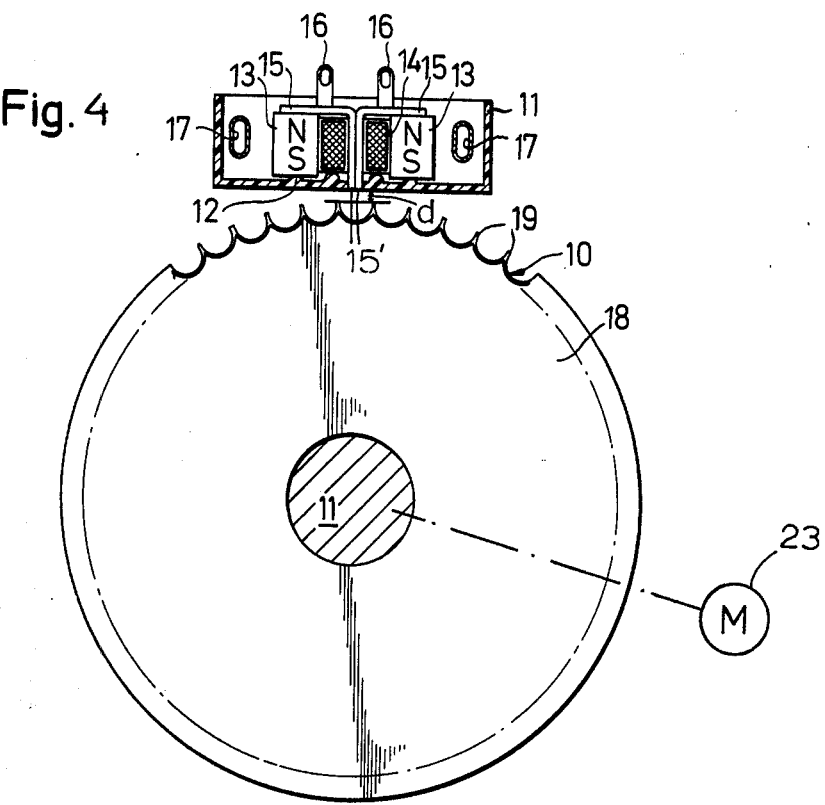
FIG. 4 is a section taken along the line IV — IV of FIG. 3.

As seen in FIGS. 3 and 4 a motor 23 has a shaft 11 to which is fitted a synthetic-resin dielectric disk 18 on whose outer periphery there is provided an undulating iron ring 10 formed with a plurality of points 19 that are angularly equispaced about the periphery of the disk 18. Fixed adjacent the periphery of this disk 18 is a synthetic-resin housing 11 having two ribs 12 on which are provided a pair of permanent magnets 13. A fine-wire coil 14 of the telephone type is fitted between these two magnets 13 with a pair of L-shaped soft iron bars 15 extending over the magnets 13 and down through the hole in the center of the core 14 with their ends 15' flush with the bottom of the housing 11 and spaced from the orbit defined by the points 19 on rotation of the shaft 11 by a distance $d$ equal to 1.5 mm. A pair of lugs 16 are provided that are connected to the opposite ends of the wire and coil 14 and a pair of through-going sleeves 17 are provided for fixedly securing the housing 11. After assembly the entire cup-shaped housing 11 is filled with a synthetic-resin potting compound so as securely to fix all of the elements 13–16 in place and protect them from corrosion and the like.

Figure 1:
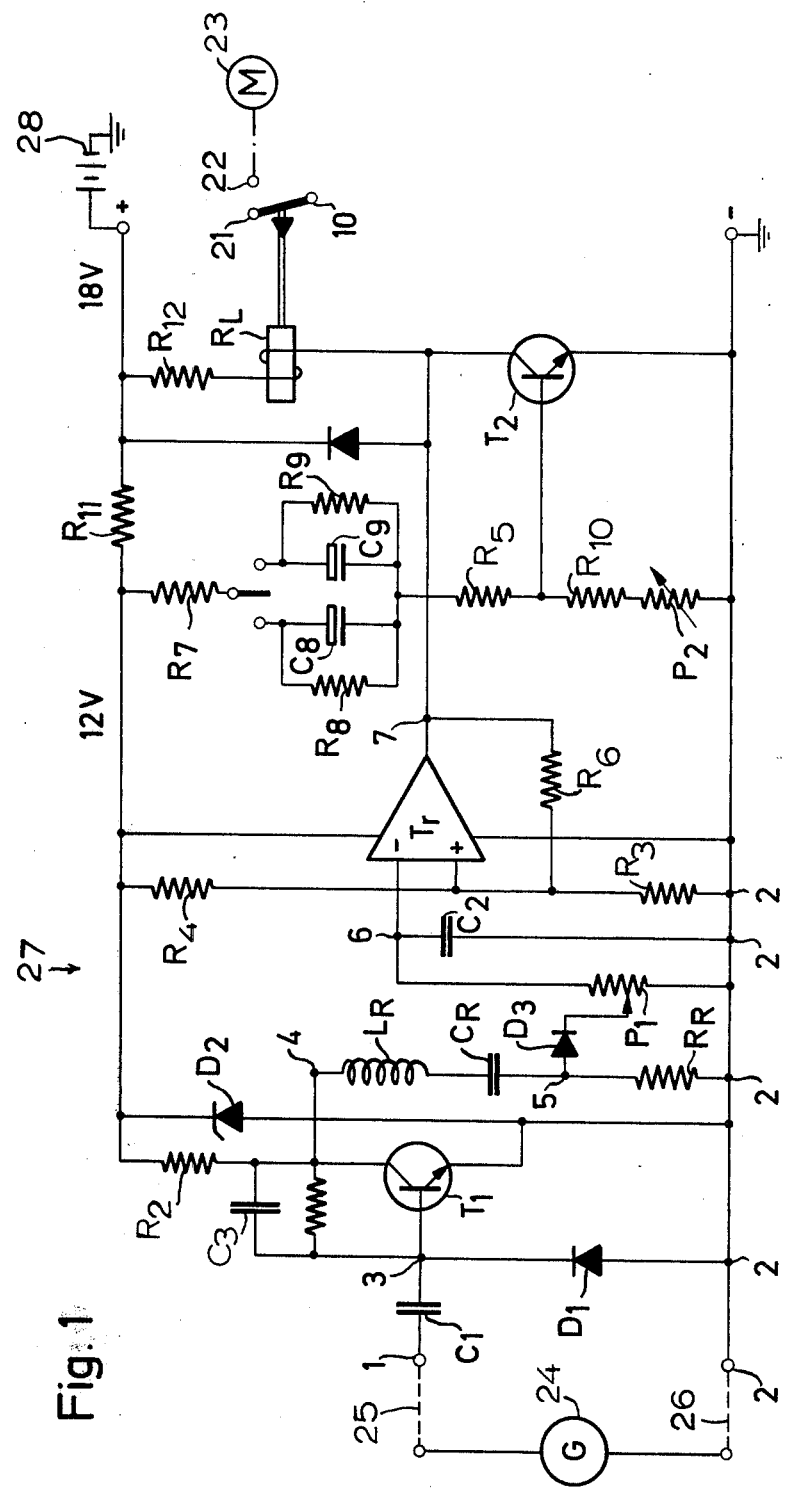
FIG. 1 is a schematic diagram of the circuit of the system according to the present invention.

FIG. 1 shows how the generator 24 formed by the combination of this wheel 18 and detector head is connected via a pair of conductors 25 and 26 to a pair of terminals 1 and 2 of a control circuit 27. A capacitor $C_1$ connects the terminal 1 to another terminal 3 and to the base of a transistor $T_1$. In addition a diode $D_1$ is connected between the terminal 3 and a ground line connected to the terminal 2. A bias resistor $R_2$ is connected on one side via a further resistor $R_{11}$ to the positive side of a voltage source 28 and on its other side to the collector of the PNP transistor $T_1$. In addition a capacitor $C_3$ and resistor $R_1$ are connected between the collector and base of this transistor $T_1$. The emitter of this transistor is connected to ground. A stabilizing zener diode $D_2$ is connected between the ground and the side of the resistor $R_2$ turned away from the collector of the transistor $T_1$. This zener diode $D_2$ serves to stabilize the amplifier constituted by the transistor $T_1$.

Connected between a terminal 4 at the collector of the transistor $T_1$ and another terminal 5 kept above ground by a load resistor $R_R$ is a series-resonant circuit comprising an inductance $L_R$ and a capacitor $C_R$. A diode $D_3$ is connected between the terminal 5 and the wiper of a potentiometer $P_1$ which has one side connected to the ground 2 and another side connected to a terminal 6 at the input of a Schmitt trigger $T_r$. A capacitor $C_2$ is connected between the terminal 6 and the ground.

Resistors $R_4$ and $R_3$ serve to bias the other input of the Schmitt trigger $T_r$ in the manner described in Pulse, Digital, Switching Waveforms by D. Millman and H. Taub (McGraw, Hill; 1965) at page 389 ff. Another resistor $R_6$ is connected between this input and a terminal 7 at the output of the Schmitt trigger $T_r$.

A relay $R_L$ has one side connected via a resistor $R_{12}$ to the positive side of the source 28 and another side connected to the output terminal 7, with a diode $D_4$ shunting across the resistor $R_{12}$ and relay $R_L$ to protect it from sparking on opening.

Figure 2:
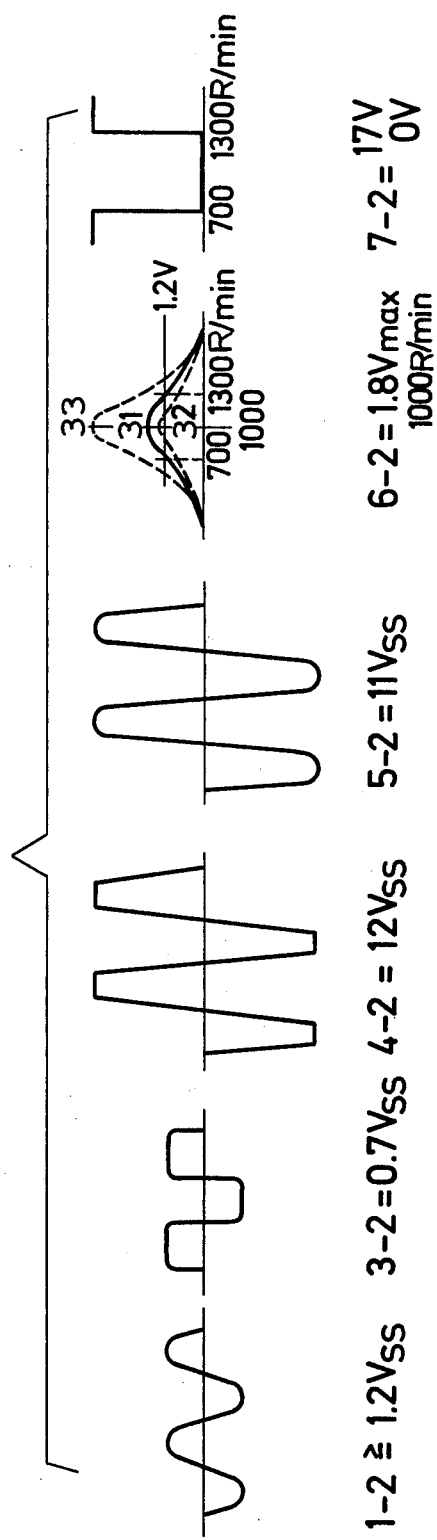
FIG. 2 is a graph illustrating the operation of the device according to the present invention.

The apparatus described above functions as follows:

As the motor 23 rotates and the disk 18 turns a sinusoidal voltage is induced in the coil 14 which appears as shown at the far left in FIG. 2 as a voltage $V_{SS}$ of at least 1.2 volts between the terminals 1 and 2. The clipper diode $D_1$ connected between the terminals 3 and 2 then transforms this signal into a series of pulses of a voltage of 0.7 volts.

The transistor $T_1$ amplifies this signal so as to form between points 4 and 2 square-wave pulses of a voltage of 12 volts, as this transistor $T_1$ is biased such that it is saturated by the pulses of 0.7 volts between terminals 3 and 2.

The system according to this invention is set to maintain a motor speed at 1000 rpm, or in a system with 36 points 19 on the ring 10 the tuned circuit of inductor $L_R$ and capacitor $C_R$ is tuned to 500 Herz. Assuming that the shaft is rotating at this speed the tuned circuit will give an output as also indicated by FIG. 2 between point 5 and 2 of 11 volts, with only one volt of the signal between points 4 and 2 being lost in the load resistor $R_R$.

The Schmitt trigger $T_r$ is triggered by a signal of 1.2 volts between points 6 and 2. The potentiometer $P_1$ is set such that the direct-current voltage obtained through the diode $D_3$ from the tuned circuit $L_R$-$C_R$ is only partially fed into the input 6 of this trigger. In the illustrated embodiment the potentiometer $P_1$ is set so that when the rpm of the shaft 11 is above 700 rpm and below 1300 rpm the signal 31 will be below 1.2 volts and as shown to the far right in FIG. 2 the voltage between points 7 and 2 will be 0 volts at this time and thereby opeaate the relay $R_L$. As the wiper on the potentiometer $P_1$ is moved closer to ground 2 a voltage curve 32 lower than the curve 31 is obtained and a much smaller range of variation is possible for the motor 23. On the other if the wiper $P_1$ is moved closer to the terminal 6 a much broader range is possible as indicated by dashed curve 33 of FIG. 2. In any case the maximum resistance of the potentiometer $P_1$ and load resistor $R_R$ are such that the maximum signal that can be fed into terminal 6 is 1.8 volts. The terminals 21 and 22 of the relay $R_1$ can be connnected to the pole 20 of this relay $R_1$ to speed up the motor when it is too slow or to slow it down when it is too fast, or merely to shut it off whenever the motor varies from the desired speed.

FIG. 1 also shows a switch 29 which can connect a resistor $R_7$ which is connected between the resistors $R_{11}$ and $R_2$ to a right-hand rotation tuned circuit of parallel capacitor $C_8$ and resistor $R_8$ or a left-hand rotation resonant circuit of a resistor $R_9$ and capacitor $C_9$. The other sides of these two tuned circuits are connected via a resistor $R_5$ to the base of a transistor $T_2$, this base being also connected via a fixed resistor $R_{10}$ a variable resistor $T_2$ to ground 2. The emitter of this transistor $T_2$ is connected to ground and the collector is connected to the terminal 7 and, therefore, to the relay $R_L$.

The switch 29 is operated during start up of the motor depending on the rotation direction, so as to actuate the relay inspite of the face that the frequency of the signal at points 1 and 2 is far below that necessary to sustain operation of the relay under normal circumstances. Once the motor is up to speed the switch 29 is left in a central position indicated in FIG. 1 and the transistor $T_2$ is open circuited.

The relay $R_L$ is not energized when the rotation speed of the shaft falls within the desired range. When, however, the rotation rate falls within the desired range the Schmitt trigger $T_r$ is released and the voltage between points 7 and 2 falls from 17 volts to 0 volts so as to disconnect this relay $R_L$ and thereby shut off the power supplied to the motor 23.

With the system according to the present invention it is possible to obtain a variable selectivity in the motor-speed control. At the same time the criticality of spacing between the detector head and the wheel is much less important than hitherto, since so long as the signal equals 1.2 volts between points 1 and 2 the system will operate perfectly. With many prior-art systems it was necessary to have a voltage in excess of 5 volts for proper operation. Here if the voltage raises above 1.2 volts it is simply clipped as the diode $D_1$ avalanches so that the system is frequency responsive only.

We claim:

1. An apparatus for controlling the rotation speed of a shaft driven by a motor, said apparatus comprising:
   a nonmagnetic disk carried on said shaft and having an outer periphery;
   a regularly undulated ferromagnetic ring carried on said outer periphery and forming a plurality of magnetically detectable and angularly equispaced regions thereon;
   a detector head fixed adjacent said ring and having a magnetic coil, whereby rotation of said shaft displaces said regions past said head and causes said coil to generate a generally sinusoidal signal having a frequency corresponding to the rotation speed of said shaft;
   means connected to said head and including a diode for clipping said sinusoidal signal and thereby forming a succession of pulses of like amplitude;
   amplifier means connected to the clipping means and including a transistor, a zener diode connected across said transistor, and a capacitor connected between said transistor and said coil increasing the amplitude of said succession of pulses;
   filter means including a resonant circuit connected to said amplifier means and receiving the amplified clipped pulses for producing a sinusoidal output only when the frequency of said amplified clipped pulses lies within a predetermined range;
   detector means including a capacitor and a diode connected to said filter means for converting said sinusoidal output into a direct-current voltage signal; and
   switch means connected between said detector means and said motor operable by said voltage signal when same exceeds a predetermined threshold value to alter the rotation speed of said motor, said switch means including a Schmitt trigger and a relay connected thereto.

2. The apparatus defined in claim 1, further comprising means operable during starting of said motor for maintaining operation thereof with the rotation speed of said shaft below said range.

3. An apparatus for controlling the rotation speed of a shaft driven by a motor, said apparatus comprising:
   a nonmagnetic disk carried on said shaft and having an outer periphery;
   a regularly undulated ferromagnetic ring carried on said outer periphery and forming a plurality of magnetically detectable and angularly equispaced regions thereon;
   a detector head fixed adjacent said ring and having a magnetic coil, whereby rotation of said shaft displaces said regions past said head and causes said coil to generate a generally sinusoidal signal having a frequency corresponding to the rotation speed of said shaft;
   means connected to said head and including a diode for clipping said sinusoidal signal and thereby forming a succession of pulses of like amplitude;
   amplifier means connected to the clipping means and including a transistor, a zener diode connected across said transistor, and a capacitor connected between said transistor and said coil increasing the amplitude of said succession of pulses;
   filter means including a resonant circuit connected to said amplifier means and receiving the amplified clipped pulses for producing a sinusoidal output only when the frequency of said amplified clipped pulses lies within a predetermined range;
   detector means including a capacitor and a diode connected to said filter means for converting said sinusoidal output into a direct-current voltage signal;
   switch means connected between said detector means and said motor operable by said voltage signal when same exceeds a predetermined threshold value to alter the rotation speed of said motor; and
   means for biasing said transistor of said amplifier means so that the clipped sinusoidal signal saturates said transistor.

4. The apparatus defined in claim 3, further comprising a variable resistor between said filter means and said switch means, whereby increasing of the resistance of said variable residtor decreases the bandwidth of said range.

5. An apparatus for controlling the rotation speed of a shaft driven by a motor, said apparatus comprising:
   a plurality of angularly equispaced magnetically detectable elements carried on said shaft,
   generator means including a coil and magnet fixed adjacent said shaft near said elements for generating a sinusoidal signal having a frequency corresponding to the rotation speed of said shaft,
   threshold-amplifier means for clipping said sinusoidal signal and thereby forming a succession of pulses of like amplitude and for increasing the amplitude of the clipped pulses,
   detector means including a resonant circuit connected to said amplifier means for generating an output only when said succession of pulses has a frequency within a predetermined range, and
   switch means connected between said detector means and said motor for altering said motor speed when said detector means stops generating said output, said switch means including a Schmitt trigger which changes state only on said output of said detector means exceeding a predetermined threshold level.

6. The apparatus defined in claim 5, further comprising a variable resistor between said amplifier means and said switch means for varying the bandwidth of said range.

7. The apparatus defined in claim 6, wherein said switch means includes a relay connected to said motor, said apparatus further comprising means connected to said relay and operable on starting-up of said motor to maintain operation of said motor when the rotation speed of said shaft is below said range.

* * * * *